July 4, 1939.　　　　　F. L. MAIN　　　　　2,164,878
BRAKE CONSTRUCTION
Filed June 28, 1937　　　2 Sheets-Sheet 1
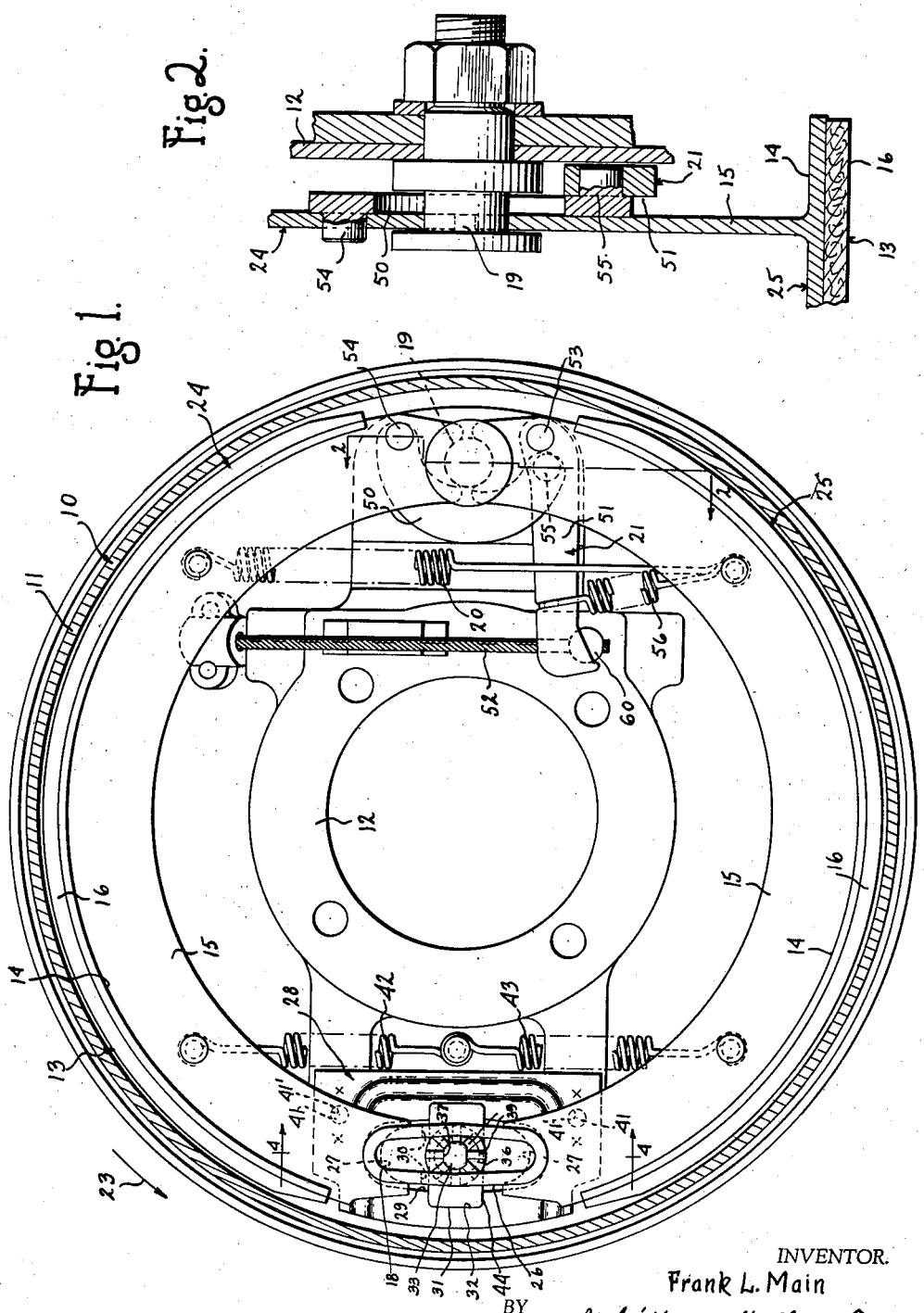
INVENTOR.
Frank L. Main
BY Whittemore Hulbert & Belknap
ATTORNEYS

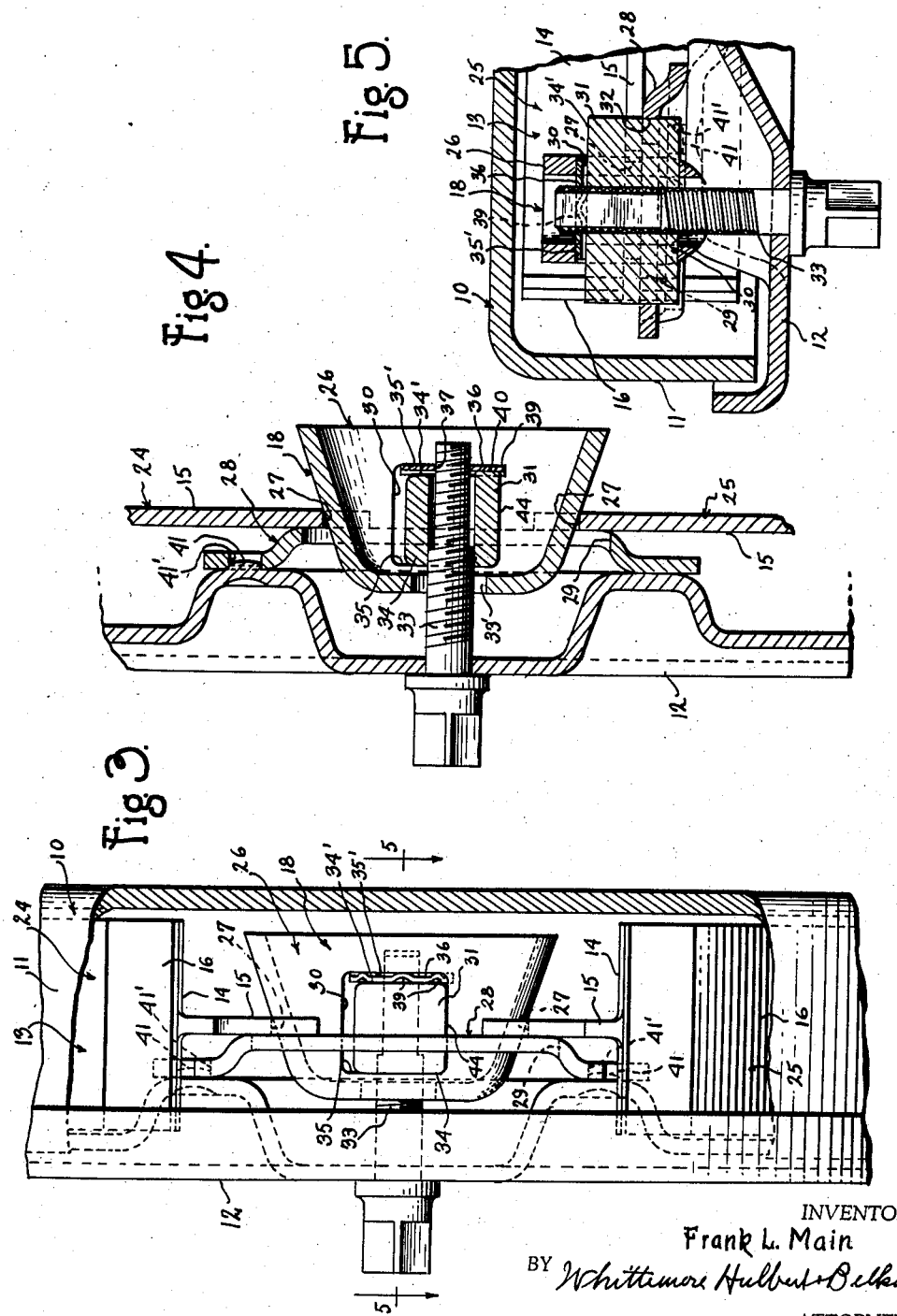

Patented July 4, 1939

2,164,878

UNITED STATES PATENT OFFICE 2,164,878

BRAKE CONSTRUCTION

Frank L. Main, Birmingham, Mich., assignor to Kelsey-Hayes Wheel Company, Detroit, Mich., a corporation of Delaware Application June 28, 1937, Serial No. 150,869

16 Claims. (Cl. 188—79.5)

This invention relates to brake mechanisms and refers more particularly to an improved adjustment anchor device.

One of the principal objects of this invention is to provide an improved adjustment anchor device composed of a relatively few simple parts capable of being readily manufactured, assembled, and installed between the ends of the brake shoes at one side of the brake drum for adjusting both of the shoes radially relative to the brake flange.

Another advantageous feature of the present invention resides in the provision of an adjustment anchor device of the type set forth in the preceding paragraph wherein efficient adjustment is provided and independent radial movement of the shoes is permitted without the use of the adjustment links hereinbefore provided between the opposite sides of the adjusting device and the adjacent ends of the shoes. The elimination of the links not only reduces the number of parts but, in addition, reduces internal friction to the minimum and this is desirable particularly when the adjustment device is employed in a symmetrical brake having limited or no servo action.

It is a further object of this invention to provide an adjustment device possessing the foregoing features and mounted for limited circumferential movement relative to the drum upon operation of the brake to permit the transfer of torque from the primary shoe to the secondary shoe.

The foregoing, as well as other objects, will be made more apparent as this description proceeds, especially when considered in connection with the accompanying drawings, wherein:—

Figure 1 is a side elevational view of brake mechanism constructed in accordance with this invention;

Figure 2 is a sectional view taken substantially on the plane indicated by the line 2—2 of Figure 1;

Figure 3 is a fragmentary side elevational view illustrating the adjustment anchor device;

Figure 4 is a sectional view taken substantially on the plane indicated by the line 4—4 of Figure 1; and Figure 5 is a sectional view taken substantially on the plane indicated by the line 5—5 of Figure 3.

It will be noted that in Figure 1 I have shown a brake drum 10 having an annular axially extending brake flange 11 and having a backing plate 12 closing the rear side of the drum. The backing plate is fixed against rotation and supports the brake mechanism within the drum.

In the present instance, the brake mechanism is provided with brake friction means 13 comprising a pair of brake shoes having the opposite ends spaced from each other circumferentially of the brake flange 11. Upon reference to Figure 2, it will be noted that the brake shoes are substantially T-shaped in cross section having axially extending head portions 14 and radially inwardly extending web portions 15. The shoes are supported upon the backing plate with the axially extending head portions adjacent the brake flange 11 and suitable linings 16 having the required coefficient of friction are secured to the outer surfaces of the head portions 15 for frictional engagement with the inner cylindrical surface of the brake flange 11.

Mounted upon the backing plate 12 of the brake drum between the ends of the shoes at one side of the drum is an adjustment anchor device 18 embodying means for swinging the shoes radially of the brake drum about an abutment 19 secured to the backing plate 12 between the opposite ends of the brake shoes. The latter ends of the brake shoes are normally urged into engagement with the abutment 19 by means of a retracting spring 20 interconnecting the shoes and the shoes are moved outwardly relative to the abutment 19 into engagement with the brake flange 11 by an actuator 21. The particular type of actuator selected for the purpose of illustration will be more fully hereinafter set forth but it may be pointed out at this time that this actuator is carried by the shoes so as to be capable of movement circumferentially of the drum with the shoes. It may also be pointed out at this time that the forward direction of rotation of the brake drum is designated in Figure 1 by the reference character 23 and that the brake shoe 24 is the leading or primary shoe, while the brake shoe 25 is the secondary or trailing shoe.

The adjustment anchor device 18 is shown in Figures 3 to 5, inclusive, as comprising an axially movable wedge 26 having the opposite sides inclined outwardly from the rear side of the wedge and engageable with the adjacent ends of the brake shoes. The wedge is substantially U-shaped in cross section and is elongated in the direction of rotation of the drum, as is shown in Figures 3 to 5, inclusive. Upon reference to Figure 1, it will be noted that the inclined sides of the wedge are transversely curved and the adjacent ends of the web portions 15 of the brake shoes are provided with correspondingly shaped recesses 27 adapted to slidably receive the transversely curved sides of the wedge.

Upon reference to Figure 5, it will be noted that the radially inner and outer walls of the wedge 26 are provided with registering slots 30 adapted to receive a block 31 extending radially through the wedge and located in a radial slot 32 in the supporting plate 28. The block 31 is provided with an axially extending threaded bore through the portion thereof located in the wedge and an adjusting screw 33 is threaded in the bore. As shown in Figure 4, one end of the screw extends outwardly through the backing plate 12 and is polygonal in shape for engagement by a suitable wrench. With the above construction, it will be noted that the block 31 is held from rotation relative to the screw 33 so that when the latter is rotated, the rear side 34 of the block cooperates with the adjacent ends 35 of the registering slots 30 in the wedge to move the latter axially. Attention is also called to the fact at this time that while the block 31 is held from rocking movement relative to the screw 33 by engagement of the opposite ends thereof in the radial slot 32 formed in the plate 28, nevertheless, the registering slots 30 through the wedge have a width greater than the width of the block and, since the opening 29 through the plate 28 is larger than the portion of the wedge extending therethrough, it follows that the wedge may rock in a radial plane relative to the block 31. In addition, it will be noted that the opening 33' through the rear wall of the wedge for receiving the screw 33 is substantially greater in diameter than the screw and, as a consequence, the wedge may also be shifted relative to the block radially of the drum. This radial shifting and rocking movement of the wedge insures outward movement of the adjustment ends of the shoes into engagement with the drum without the necessity of employing the special linkage between the wedge and ends of the shoes.

In the present instance, a clicker spring 36 is located between the forward end 35' of the registering slots 30 in the wedge and the adjacent side 34' of the block 31. This spring is, of course, apertured to receive the adjusting screw 33 and the latter is provided with flats 37 which cooperate with corresponding flats on the spring to effect rotation of the spring as a unit with the screw. The clicker spring is formed of a series of radially extending serrations 39 successively engageable with a rib 40 extending axially inwardly from the side 34' of the block 31. It follows from the above that the spring rotates as a unit with the screw 33 relative to the block so that the serrations are successively moved into registration with the rib 40 on the block. It will, of course, be understood that the rib 40 is positioned on the block radially inwardly from the periphery of the spring so that as the latter rotates relative to the block, the center portion thereof flexes axially inwardly each time one of the serrations leaves the rib 40. With the above arrangement, it will be noted that accidental movement of the adjusting screw is not only prevented but predetermined increments of adjustment are indicated by the clicks resulting from the snap engagement of the serrations with the rib.

When it is desired to employ the present invention in association with a servo brake, provision is made for the adjustment anchor device to shift circumferentially of the drum in the direction of forward rotation thereof. In the present instance, this is accomplished by forming the registering slots 30 in the wedge of sufficient dimension to permit the wedge 26 to slide relative to the plate 28 and block 31 in the direction of forward rotation of the brake drum. With this construction, it will be noted that the torque from the primary shoe is transferred to the secondary shoe through the wedge and this torque is ultimately taken by the plate 28 through the block 31 with the result that the adjusting screw is not required to take the braking torque. It may be pointed out at this time that the plate 28 is welded or otherwise suitably secured to the backing plate 12, and the weld is relieved of the torque by means of projections 41 extending axially inwardly from the backing plate into corresponding recesses 41' in the torque plate 28.

Upon reference to Figure 1, it will be noted that the adjustment ends of the shoes are maintained into engagement with the opposite sides of the wedge by the retracting springs 42 and 43 having their outer ends respectively connected to the primary and secondary shoes and having their inner ends anchored on the backing plate. The spring 43 is of greater strength in order to normally maintain the adjustment device in the positions thereof shown in Figures 3 to 5, inclusive, or, in other words, the spring 43 functions to maintain the wedge 26 in engagement with the side 44 of the block. It follows from the above construction that the shoes are positively anchored in the reverse direction of rotation and that no servo is effected when the brake is applied during rotation of the drum in the reverse direction.

Although the adjustment anchor device previously described is not limited to any specific type of actuator for the brake shoes, nevertheless, for the purpose of illustration, I have shown the actuator 21 as being of the toggle linkage type comprising a spreader link 50 and a lever 51 having the radially inner end connected to a cable 52. The radially outer end of the lever 51 is pivoted to the secondary shoe at a point 53 adjacent the drum diameter and is operatively connected intermediate the ends thereof to the primary shoe by means of the spreader link 50. As shown in Figure 1, one end of the spreader link is pivotally connected to the primary shoe at the point 54 adjacent the drum diameter and the opposite end of the spreader link is pivotally connected to the lever 51 at a point 55 adjacent the point of pivotal connection 53. The spreader link is arcuate in configuration to permit the above relative location of the respective pivots and at the same time afford clearance for the abutment 19. The lever is retracted by means of a spring 56 which is lighter than the spring 43 but is of sufficient strength to provide the load required on the secondary shoe to maintain the secondary shoe into engagement with the abutment 19 during the interval the primary shoe 24 is moved outwardly into engagement with the brake flange. This prevents any noise which would otherwise result when the servo action wraps the secondary shoe 25 against the abutment 19.

With the brief description of the actuator noted above, it will be seen that when the drum is rotated in the forward direction indicated by the arrow 23 and the cable 52 is operated, the lever 51 fulcrums about the pivot 53 and moves the primary shoe radially outwardly into engagement with the brake flange 11. The servo action generated in the primary shoe by engagement of the same with the brake flange is transmitted through the adjustment wedge 26 to the secondary shoe and assists movement of the latter into frictional engagement with the brake flange. When the actuating force on the cable 52 is released, the adjustment wedge is returned to its normal position in abutting relation to the side 44 of the block 31 by the retraction spring 43 and the actuator ends of the shoes are returned into engagement with the abutment 19 by the springs 20 and 42.

Assuming now that the drum is rotating in the reverse direction and that the cable 52 is operated, it will be noted that the toggle linkage will operate in the same manner to move the actuator ends of the shoes radially outwardly until the shoes come into frictional contact with the brake flange, whereupon continued operation of the cable causes the lever 51 to fulcrum about the point 55 instead of the point 53. The resulting reduction in leverage is not objectionable in reverse, since deceleration is effected at much slower speeds. In addition, there is no servo action in the brake when applied in the reverse direction due to the fact that the adjustment wedge 26 anchors against the side 44 of the block 31 and prevents the transfer of torque from one shoe to the other.

Although my improved adjustment device is not limited to an actuator of the type briefly outlined above, nevertheless, this actuator is advantageous in that it is not only simple in construction, but affords efficient braking without any tendency for the brake to grab or lock up when fast deceleration is effected at low speed. In this connection, it is to be noted that the locations of the pivots 53 and 55 are so determined with respect to the connection 60 of the cable 52 with the inner end of the lever 51, that the cable pull is at substantially right angles to the lever and this results in a substantially constant leverage ratio throughout the brake operation. In addition, it will be noted that the pivots 53, 54, and 55 are so arranged with respect to the abutment 19 for the actuator ends of the shoes that adjustment of the brake shoes about the abutment does not materially change the position of the point of connection 60 of the cable with the lever. As a result, it is not necessary to adjust the cable when adjustment of the brake shoes is effected.

What I claim as my invention is:

1. In brake mechanism, a brake drum, a backing plate for said drum, brake friction means located in the drum and having spaced ends, means extending between the ends of the friction means for adjusting the latter including a wedge having the sides thereof adjacent the ends of the friction means inclined and slidably engaging said ends, and means mounting said wedge on the backing plate for both radial and axial movement relative to the brake drum.

2. In brake mechanism, a brake drum, a backing plate for the drum, brake friction means located in the drum and having spaced ends, means extending between the ends of the friction means for adjusting the latter including a wedge having the sides thereof adjacent the ends of the friction means inclined and slidably engaging said ends, means mounting said wedge on the backing plate for axial movement relative to the friction means and for rocking movement about an axis extending in the same direction as said axial movement, and means for moving said wedge axially.

3. In brake mechanism, a brake drum, a backing plate for said brake drum, brake friction means located in the drum and having spaced ends, means extending between the ends of the friction means for adjusting the latter including a wedge having the sides thereof adjacent the ends of the friction means inclined and slidably engaging said ends, a mounting for said wedge on the backing plate providing for axial movement of the wedge relative to the friction means and for both rocking and circumferential shifting movement of the wedge relative to the brake drum, and means for adjusting said wedge axially of the brake drum relative to the friction means.

4. In brake mechanism, a brake drum, a backing plate for the brake drum, brake friction means located in the drum and having spaced ends, means extending between the ends of the friction means for adjusting the latter including a wedge having the sides thereof adjacent the ends of the friction means inclined and slidably engaging said ends, a mounting for said wedge on the backing plate providing for axial movement of the wedge relative to the friction means and for movement both radially and circumferentially of the brake drum, and means for adjusting said wedge axially of the brake drum relative to the friction means.

5. In brake mechanism, a brake drum, brake friction means located in the drum and having spaced ends provided with arcuate recesses, a wedge extending axially of the drum between said ends of the friction means and having the sides adjacent the shoes inclined toward the axis of the wedge and transversely curved to slidably fit in the recesses in the ends of the shoes, and means for adjusting said wedge axially of the drum relative to the friction means.

6. In brake mechanism, a brake drum, brake friction means located in the drum and having spaced ends provided with arcuate recesses, a wedge extending axially of the drum between said ends of the friction means and having the sides adjacent the shoes inclined toward the axis of the wedge and transversely curved to slidably fit in the recesses in the ends of the shoes, means supporting the wedge for movement axially of the drum relative to the friction means and for rocking movement relative to the drum, and means for adjusting said wedge axially of the drum.

7. In brake mechanism, a brake drum, brake friction means located in the drum and having spaced ends provided with arcuate recesses, a wedge extending axially of the drum between said ends of the friction means and having the sides adjacent the shoes inclined toward the axis of the wedge and transversely curved to slidably fit in the recesses in the ends of the shoes, means supporting the wedge for both radial and axial movement relative to the brake drum, and means accessible exteriorly of the brake drum for adjusting said wedge axially of the drum relative to the friction means.

8. In brake mechanism, a revoluble brake drum, a backing plate for the drum fixed against rotation, brake friction means supported on the backing plate within the drum and having spaced ends, a wedge extending axially of the drum between the ends of the friction means and having the sides adjacent said ends inclined toward the axis of the wedge to effect outward movement of said ends of the friction means upon axial movement of the wedge in one direction, a non-rotatable member supported on the backing plate for movement axially of the drum and extending radially through the wedge, and an adjusting screw extending through the wedge and threadedly engaging said member.

9. In brake mechanism, a revoluble brake drum, a backing plate for the drum fixed against rotation, brake friction means supported on the backing plate within the drum and having spaced ends, a wedge extending axially of the drum between the ends of the friction means and having the sides adjacent said ends inclined toward the axis of the wedge to effect outward movement of said ends of the friction means upon axial movement of the wedge in one direction, a non-rotatable member supported on the backing plate for movement axially of the drum and extending radially through the wedge, an adjusting screw extending through the wedge and threadedly engaging said member, and cooperating means on the screw and member for indicating predetermined increments of adjustment of said wedge.

10. In brake mechanism, a revoluble brake drum, a backing plate for the drum fixed against rotation, brake friction means supported on the backing plate within the drum and having spaced ends, a plate secured to the backing plate and having a slot therethrough elongated circumferentially of the brake drum, a wedge extending axially of the brake drum through the slot and shiftable longitudinally of the slot, said wedge having the sides thereof adjacent the ends of the friction means inclined in a direction to move the ends of the friction means outwardly upon axial movement of the wedge in one direction, a member extending radially through the wedge and having the opposite ends supported on the plate for axial movement with the wedge, and an adjusting screw extending through the wedge and threadedly engaging said member.

11. In brake mechanism, a revoluble brake drum, a backing plate for the drum fixed against rotation, brake friction means supported on the backing plate within the drum and having spaced ends, a wedge extending axially of the drum between the ends of the friction means and having radially spaced inner and outer walls connected by side walls inclined toward the axis of the wedge to effect outward movement of said ends of the friction means upon axial movement of the wedge in one direction, a non-rotatable member extending radially through aligned openings in the inner and outer walls of the wedge, an adjusting screw extending into said wedge and threadedly engaging said member between the latter walls of the wedge, and means on the backing plate supporting said member for axial movement with said wedge.

12. In brake mechanism, a revoluble brake drum, a backing plate for the drum fixed against rotation, brake friction means supported on the backing plate within the drum and having spaced ends, a wedge extending axially of the drum between the ends of the friction means and having radially spaced inner and outer walls connected by side walls inclined toward the axis of the wedge to effect outward movement of said ends of the friction means upon axial movement of the wedge in one direction, a non-rotatable member extending radially through aligned openings in the inner and outer walls of the wedge, an adjusting screw extending into said wedge and threadedly engaging said member between the latter walls of the wedge, and a plate secured to the backing plate having a radial slot therethrough slidably receiving opposite ends of said member and having a circumferentially extending slot therethrough slidably receiving said wedge.

13. In brake mechanism, a revoluble brake drum, a backing plate for the drum fixed against rotation, brake friction means supported on the backing plate within the drum and having spaced ends, a wedge extending axially of the drum between the ends of the friction means and having radially spaced inner and outer walls connected by side walls inclined toward the axis of the wedge to effect outward movement of said ends of the friction means upon axial movement of the wedge in one direction, a member non-rotatably supported on the backing plate and extending radially of the drum through aligned openings in the radially spaced walls of the wedge, said openings having the dimension thereof transversely of the axis of the wedge greater than the corresponding dimension of said member providing shifting movement of the wedge circumferentially of the drum relative to said member, and an adjusting screw extending into said wedge between the radially spaced walls of the latter and threadedly engaging said member.

14. In brake mechanism, a revoluble brake drum, a backing plate for the drum fixed against rotation, brake friction means supported on the backing plate within the drum and having spaced ends, a wedge extending axially of the drum between the ends of the friction means and having radially spaced inner and outer walls connected by side walls inclined toward the axis of the wedge to effect outward movement of said ends of the friction means upon axial movement of the wedge in one direction, a member non-rotatably supported on the backing plate and extending radially of the drum through aligned openings in the radially spaced walls of the wedge, said openings having the dimension thereof transversely of the axis of the wedge greater than the corresponding dimension of said member providing shifting movement of the wedge circumferentially of the drum relative to said member, an adjusting screw extending into said wedge between the radially spaced walls of the latter and threadedly engaging said member, and a plate secured to the backing plate having a radial slot therethrough slidably receiving opposite ends of said member and having a circumferentially extending slot therethrough slidably receiving the wedge and elongated to permit said shifting movement of the wedge.

15. In brake mechanism, a revoluble brake drum, a backing plate for the drum fixed against rotation, brake friction means supported on the backing plate within the drum and having spaced ends, a wedge extending axially of the drum between the ends of the friction means and having radially spaced inner and outer walls connected by side walls inclined toward the axis of the wedge to effect outward movement of said ends of the friction means upon axial movement of the wedge in one direction, a member non-rotatably supported on the backing plate and extending radially of the drum through aligned openings in the radially spaced walls of the wedge, said openings having the dimension thereof transversely of the axis of the wedge greater than the corresponding dimension of said member providing shifting movement of the wedge circumferentially of the drum relative to said member, an adjusting screw extending into said wedge between the radially spaced walls of the latter and threadedly engaging said member, and a plate secured to the backing plate having a radial slot therethrough slidably receiving opposite ends of said member and having a circumferentially extending slot therethrough, said circumferentially extending slot having a length sufficient to permit said shifting movement of the wedge and having a width greater than the width of the wedge to provide for radial movement of the latter relative to the backing plate.

16. In brake mechanism, a revoluble brake drum, a backing plate for the drum fixed against rotation, brake friction means supported on the backing plate within the drum and having spaced ends, a wedge extending axially of the drum between the ends of the friction means and having the sides adjacent said ends inclined toward the axis of the wedge to effect outward movement of said ends of the friction means upon axial movement of the wedge in one direction, a non rotatable member supported on the backing plate for movement axially of the drum and extending radially through an opening in said wedge, said opening having a dimension transversely of the axis of the wedge greater than the corresponding dimension of said member to allow shifting movement of the wedge with the friction means circumferentially of the drum, means normally urging the side of the opening through the wedge facing the forward direction of rotation of the drum into abutting engagement with said member, and an adjusting screw extending through the wedge and threadedly engaging said member.

FRANK L. MAIN.